United States Patent
Rocheleau

(10) Patent No.: US 6,283,157 B1
(45) Date of Patent: Sep. 4, 2001

(54) SWEAT FLANGE, PIPING SYSTEM AND METHOD OF USE

(75) Inventor: John W. Rocheleau, Concord, NH (US)

(73) Assignee: Becca Tools, Inc., Concord, NH (US)

( * ) Notice: Subject to any disclaimer, the term of this patent is extended or adjusted under 35 U.S.C. 154(b) by 0 days.

(21) Appl. No.: 09/495,573

(22) Filed: Feb. 1, 2000

Related U.S. Application Data

(60) Provisional application No. 60/118,154, filed on Feb. 1, 1999.

(51) Int. Cl.[7] ............................... F16L 9/02; F16L 23/00
(52) U.S. Cl. .......................... 138/109; 138/171; 285/416; 285/148.25; 285/148.28; 285/289.1
(58) Field of Search ..................................... 138/109, 171; 285/148.8, 148.25, 148.28, 289.1

(56) References Cited

U.S. PATENT DOCUMENTS

| | | | |
|---|---|---|---|
| 2,066,775 | * | 1/1937 | Fritsch . |
| 2,157,918 | * | 5/1939 | Rankin . |
| 3,169,785 | * | 2/1965 | Ziebold . |
| 3,830,262 | * | 8/1974 | Lago ..................... 138/109 |
| 3,909,049 | * | 9/1975 | Blatnica ................ 285/416 |
| 4,336,958 | * | 6/1982 | Goetzinger ............ 138/109 |
| 4,556,240 | * | 12/1985 | Yoshida ................ 138/109 |
| 4,691,740 | * | 9/1987 | Suetlik et al. ........ 138/109 |
| 4,784,413 | * | 11/1988 | Hashimoto ........... 285/416 |
| 4,800,927 | * | 1/1989 | Torichigai et al. ... 138/109 |
| 4,998,597 | * | 3/1991 | Bainbridge et al. .. 138/109 |
| 5,171,041 | * | 12/1992 | McMillan et al. .... 138/109 |
| 5,368,669 | * | 11/1994 | Maine et al. .......... 138/109 |

\* cited by examiner

*Primary Examiner*—James Hook
(74) *Attorney, Agent, or Firm*—Michael J. Persson; Lawson, Philpot & Persson P.C.

(57) ABSTRACT

A sweat flange, piping system utilizing the same, and method of installing a circulator to a copper pipe. The sweat flange includes a base portion having a predetermined shape and at least two bolt openings dimensioned to accept at least two mounting bolts. A shoulder portion extends from the base portion and includes a substantially circular pipe opening that extends through the base portion and the shoulder portion. The pipe opening includes a first portion dimensioned to accept the pipe and a second portion of decreased diameter in order to limit the travel of the pipe through the opening. The sweat flange is attached to the pipe by inserting the pipe into the pipe opening of the flange and soldering the two together using art recognized soldering techniques. The piping system includes at least one pipe, a sweat, a pair of mounting bolts and a circulator or other pump. The piping system is assembled by inserting the pipe within the pipe opening in the sweat flange and soldering the pipe to the sweat flange. The pipe and the sweat flange are allowed to cool and the bolt openings of the sweat flange are aligned with the bolt openings of the volute flange. The mounting bolts are disposed through the bolt openings in pipe flange and the volute flange and are secured such that the sweat flange and the pump are secured together.

12 Claims, 7 Drawing Sheets

SWEAT FLANGE, PIPING SYSTEM AND METHOD OF USE

PRIORTY CLAIM

This application claims the benefit of priority, pursuant to Title 35, United States Code §119(e), of U.S. Provisional Patent Application Ser. No. 60/118,154, filed on Feb. 1, 1999.

FIELD OF THE INVENTION

The present invention relates to the field of plumbing and heating and, in particular, to a flange for connection to a water circulator or pump and to a piping system utilizing the same.

BACKGROUND OF THE INVENTION

Flanges are typically used to connect pumps or flow controlling devices to a pipe, or to connect a pipe to another pipe directly. Connections of this type are used extensively in the plumbing and heating industry, especially with steel, brass or copper pipes.

A typical piping system includes a copper pipe, a copper adapter having a threaded portion, a pipe flange dimensioned to mate with the threaded portion of the copper adapter, and a circulator having a flange dimensioned to mate with pipe flange. The typical system is assembled together by first soldering the adapter to the copper pipe and allowing the pipe and adapter to cool. The pipe flange is subsequently threaded onto the threaded portion of the copper adapter by rotating the body of the flange using a large wrench. The circulator is disposed such that the flange is adjacent to the base portion of pipe flange and is secured to the pipe flange with bolts.

The current system poses significant problems. First, the force required to attach the flange to the pipe is substantial and a typical flange will not have a shoulder that is designed to serve as a gripping surface for tightening the flange. The absence of this shoulder necessitates the use of a large pipe wrench to attach the flange to the exterior pipe threads of the copper adapter. As the surrounding free space is usually obstructed and quite small, it is often difficult for a user to maneuver the wrench. In addition, the size and shape of the gripping surface may also vary as the flange is turned onto the pipe, thus necessitating the use of more than one wrench. For these reasons, typical pipe flanges are well known as fittings that present a fastening problem.

One particularly common problem is encountered when attaching pipe flanges to pipe ends for connection to circulators, such as those utilized in home heating systems. These flanges are typically elliptical in shape and do not readily accommodate a standard pipe wrench or other tightening device. In addition, when the elliptical ends of the flange have turned within the 180 degrees tightening arc, the wrench must be readjusted, necessitating many fatiguing and time consuming iterations to complete the task. Moreover, as the size of a pipe wrench increases, the length of the handle increases proportionally. As pipe flanges must often be attached to a circulator that is extremely close to a wall, other pipes or, even worse, a corner, the use of a long handled pipe wrench or a pry-bar and long stove bolts to attach the flange to the pipe makes this job a tiring and time consuming one.

One solution to this problem is disclosed in the inventor's U.S. patent application Ser. No. 08/897,741, now U.S. Pat. No. 5,839,331, titled FLANGE TIGHTENING TOOL. This application discloses a flange-tightening tool for use in securing a standard flange to a pipe. The tool has a base plate, a tightening hexagonal shoulder, two attachment openings, and a rotating handle perpendicular to the tightening base plate. The base plate and openings are dimensioned to mate with the flange to be tightened and the rotatable handle is attached to hexagonal shoulder and can be used to position the tool against the flange. In operation, the user positions the tool against the flange, attaches the tool to the flange by inserting bolts through the openings in the base plate, and attaches the flange to the pipe by gripping and rotating the hexagonal shoulder with an appropriately sized box or adjustable type wrench.

The inventor's co-pending application has many advantages over the current flange tightening methods. It eliminates the gripping problems associated with standard pipe flanges by gripping the flange at the mating surface rather than the shoulder. In addition, box or adjustable wrenches having appropriately sized handles may be utilized rather than the long handles associated with larger sized pipe wrenches. Despite these advantages, this solution has not gained acceptance due to the cost of the tool and the reluctance of installers to adapt their methods to new technologies.

Another problem inherent in prior art systems is the need to attach a separate threaded connector to the copper pipe in order to accommodate the threaded pipe flange. The use of such a connector adds to the material cost of the job, increases the time taken to assemble the system by adding a step to the process, and poses some danger to the copper piping system to which it is connected due to the rotational forces exerted upon the pipes through the attachment of the threaded flange. Although it is recognized that a copper adapter is not necessary in prior art systems utilizing steel or brass pipes, the predominant use of copper piping in new heating systems necessitates the use of such a connector in an increasing number of heating applications.

Therefore, there is a need for a means for attaching a flange to a copper pipe that may be utilized to install the flange adjacent to an existing circulator or other flanged device, that may be assembled in close quarters without a large pipe wrench, and that eliminates the need for a threaded copper adapter.

SUMMARY OF THE INVENTION

The present invention is a sweat flange, a piping system utilizing the same, and a method of installing a circulator to a copper pipe. In its most basic form the sweat flange includes a base portion having a predetermined shape and at least two bolt openings dimensioned to accept at least two mounting bolts. A shoulder portion extends from the base portion and includes a substantially circular pipe opening that extends through the base portion and the shoulder portion. The pipe opening includes a first portion dimensioned to accept the pipe and a second portion of decreased diameter in order to limit the travel of the pipe through the opening. The sweat flange is attached to the pipe by inserting the pipe into the pipe opening of the flange and soldering the two together using art recognized soldering techniques. The preferred sweat flange is elliptical in shape and can be made of materials whose choice is determined by the nature of the piping system and the ability to solder the pipe and the flange. The preferred flange includes a thinned area around and between the shoulder portion and the openings in the base portion of the sweat flange for reducing the weight of the flange. In some embodiments, the base portion includes a recessed portion for accepting a circular gasket, while in other embodiments, the base portion includes a substantially flat bottom without any recess.

In its most basic form, the piping system of the present invention includes at least one pipe, a sweat flange as described above, a pair of mounting bolts, and a circulator or other pump. The circulator is made up of a pump portion and a volute portion through which the fluid is pumped. The volute portion includes at least one volute flange that is dimensioned to mate with the sweat flange. In some embodiments, the volute flange includes a substantially flat mounting surface, while in others the mounting surface includes a recessed portion that is dimensioned to accept a gasket. The piping system is assembled by inserting the pipe within the pipe opening in the sweat flange and soldering the pipe to the sweat flange. The pipe and the sweat flange are allowed to cool and the bolt openings of the sweat flange are aligned with the bolt openings of the volute flange. The mounting bolts are disposed through the bolt openings in pipe flange and the volute flange and are secured such that the sweat flange and the pump are secured together. In the preferred system, a gasket is disposed be sweat flange and the volute flange.

Therefore, it is an aspect of the invention to provide a sweat flange that may be utilized to install a flange adjacent to an existing circulator or other device.

It is a further aspect of the invention to provide a sweat flange that may be easily installed in close quarters.

It is a further aspect of the invention to provide a sweat flange that does not require a special tool to install and does not require installers to depart from accepted installation methods.

It is a further aspect of the invention to provide a piping system in which a sweat flange may be easily attached to a circulator regardless of the location of the circulator in relation to walls, pipes or other devices.

It is a still further aspect of the invention to provide a piping system that allows a flange to be attached to a copper pipe without the use of a separate threaded copper adapter.

These aspects of the invention are not meant to be exclusive and other features, aspects, and advantages of the present invention will be readily apparent to those of ordinary skill in the art when read in conjunction with the following description, appended claims and accompanying drawings.

DETAILED DESCRIPTION OF THE DRAWINGS

Figure 1:
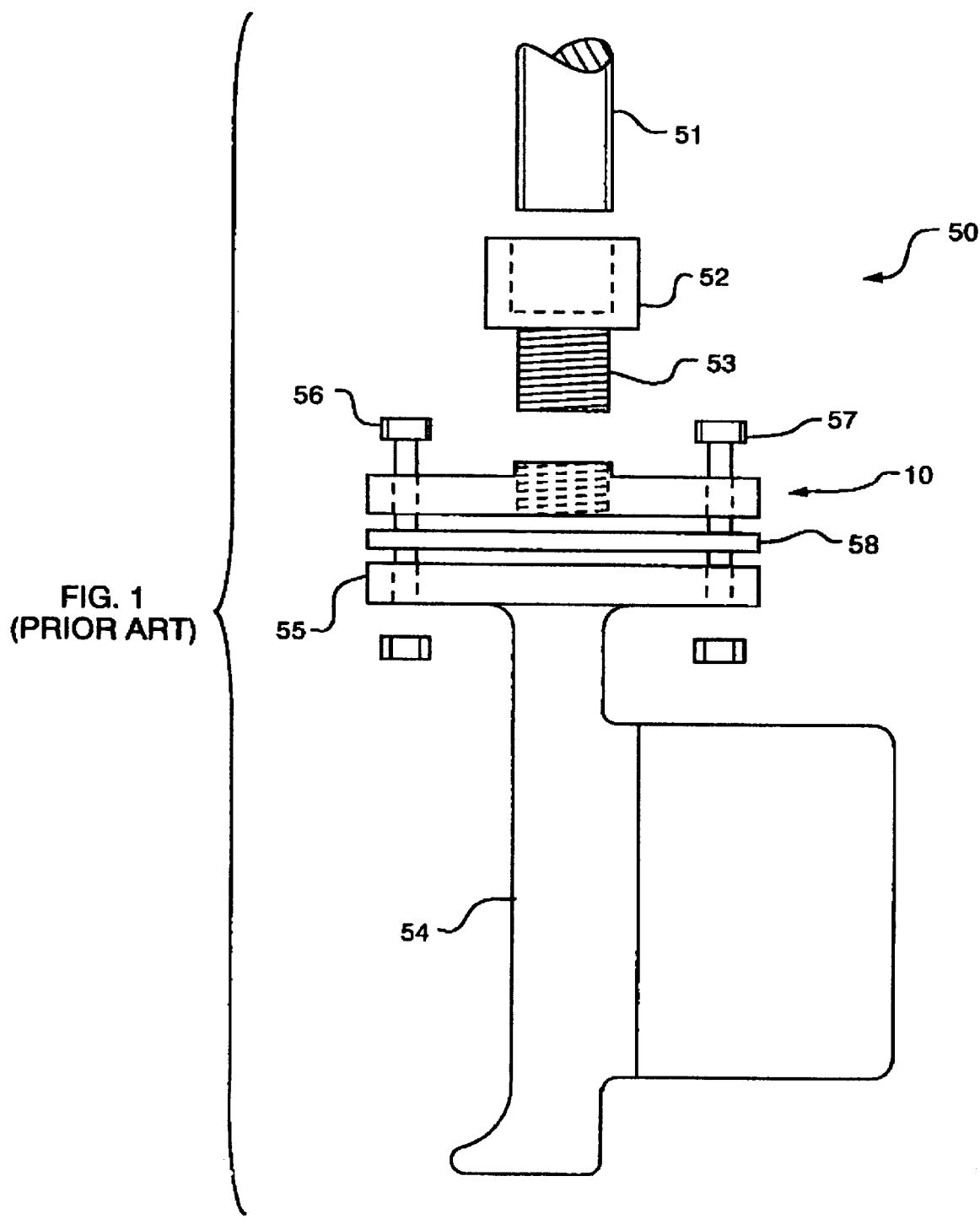
FIG. 1 is an exploded diagrammatic view of a piping system as commonly used in the art.

FIG. 1 is an exploded diagrammatic view of a prior art piping system using a typical flange that is secured to pipe ends by means of interior flange threads rotated to attach to the exterior pipe threads. The piping system 50 includes a copper pipe 51, a copper adapter 52 having a threaded portion 53, a pipe flange 10 having an interior threaded portion dimensioned to mate with the threaded portion 53 of the copper adapter 52, a circulator 54, or other pump, having a volute flange 55 dimensioned to mate with pipe flange 10, mounting bolts 56, 57 and gasket 58.

The typical system is assembled together in the arrangement shown in FIG. 1. The copper adapter 52 is first soldered to the copper pipe 51 and allowed to cool. The pipe flange 10 is subsequently threaded onto the threaded portion 53 of the copper adapter by rotating the body of the flange 10 using a large wrench. The circulator 54 is disposed such that the volute flange 55 is adjacent to the base portion of pipe flange 10. Gasket 58 is then positioned between pipe flange 10 and volute flange 55 and mounting bolts 56, 57 are passed through the openings in pipe flange 10 and volute flange 55 and secured.

Figure 2A:
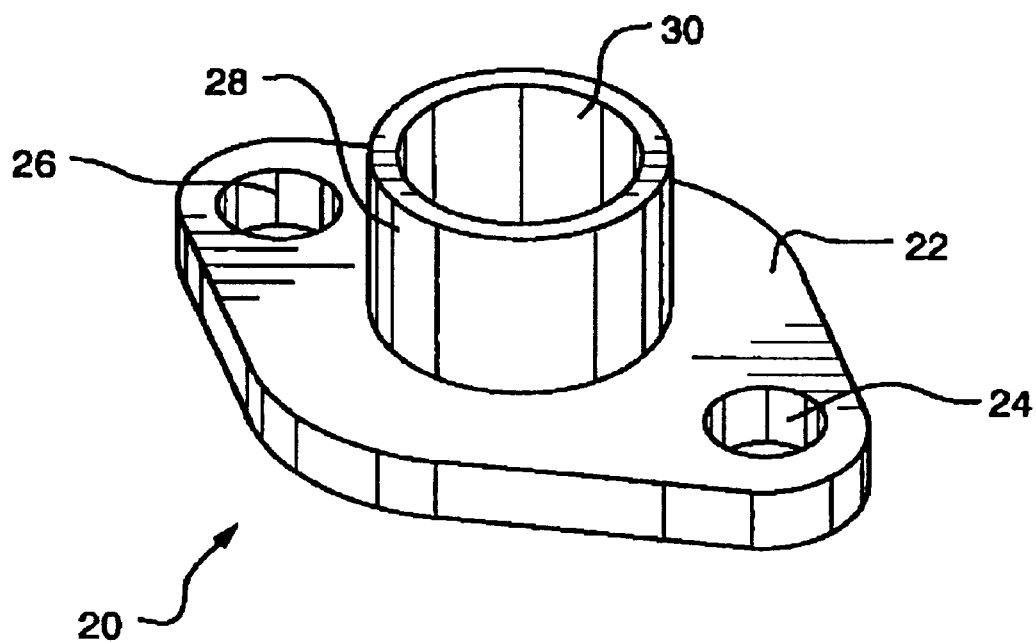
FIG. 2A is an isometric view of one embodiment of the sweat flange of the present invention having an elliptical shape.
Figure 2B:
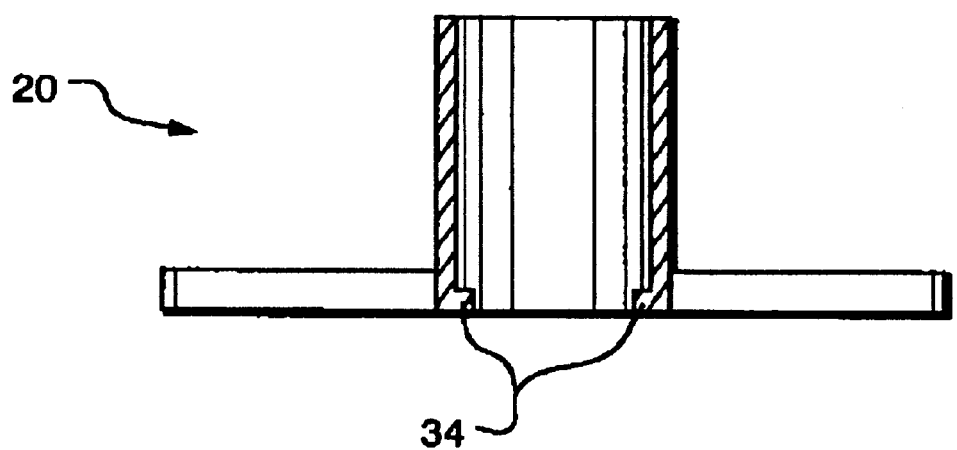
FIG. 2B is a sectional view of the sweat flange of FIG. 2A.
Figure 2C:
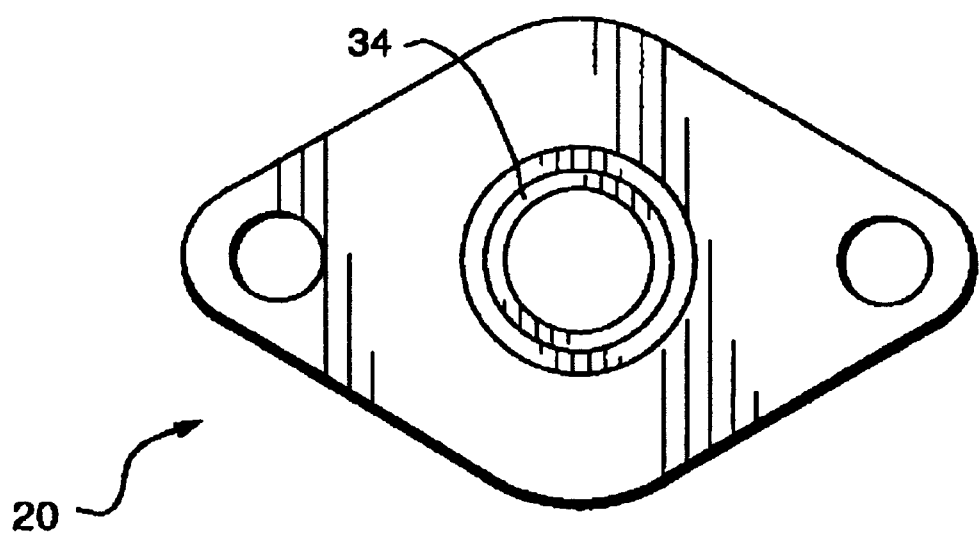
FIG. 2C is a top view of the sweat flange of FIGS. 2A and 2B.

Referring now to FIGS. 2A–2C, one embodiment of the sweat flange in accordance with the present invention is shown. The sweat flange 20 of the present invention is preferably manufactured of bronze, due to its solderability and relative durability. However, it is recognized that other solderable materials may be substituted to achieve similar results. In the embodiment of FIGS. 2A–2C, the sweat flange 20 includes a base portion 22 having an elliptical shape and least two openings 24, 26 that extend through the base portion 22. Each of the openings 24, 26 has a diameter that corresponds to the diameter of the mounting bolts (not shown) used to secure the sweat flange 20 to a mating flange. Shoulder portion 28 extends substantially perpendicularly from the base portion 22. An opening 30 extends through the base portion 22 and the shoulder portion 28. Opening 30 has a predetermined diameter to correspond to the pipe (not shown) to which the sweat flange 20 is to be attached. As shown in FIGS. 2B and 2C, opening 30 has a region of decreased dimension 34 along its height in order to limit the travel of the pipe to predetermined point.

Figure 3:
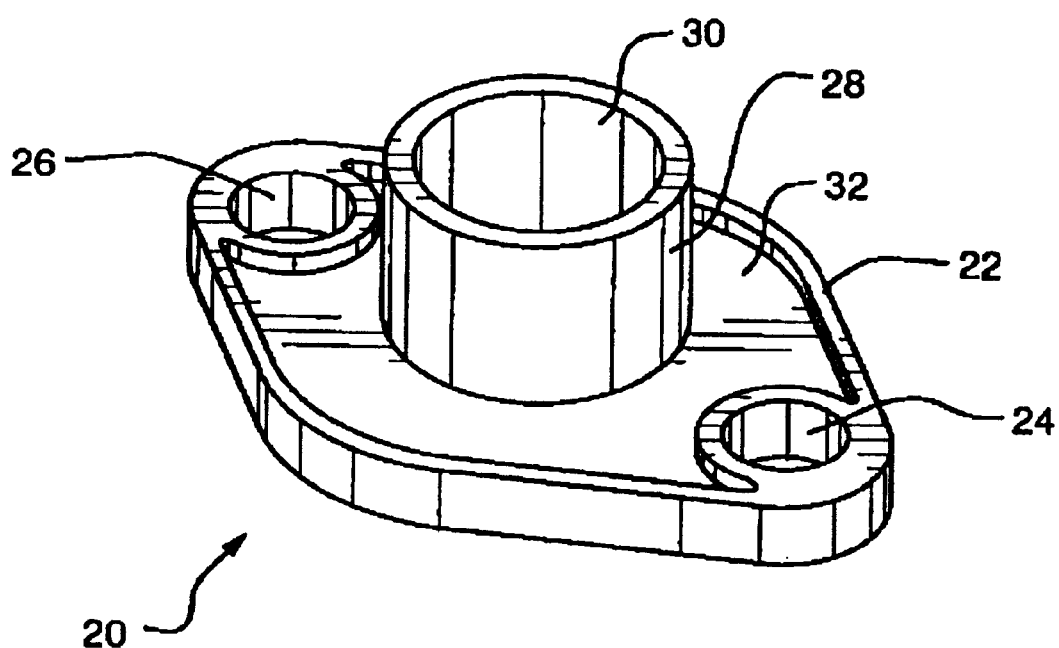
FIG. 3 is an isometric view of the preferred embodiment of an elliptical sweat flange of the present invention.

Referring now to FIG. 3, the preferred embodiment of the pipe flange 20 of the present invention is shown. As was the case with the embodiment of FIGS. 2A–2C, this embodiment includes an elliptical base portion 22 having two openings 24, 26. However, the preferred base portion 22 has a thinned area 32 in the space around and between the shoulder portion 28 and the openings 24, 26 to reduce the weight of the flange 20. This is preferred as the amount of energy required to heat the flange to the melting point of the solder is directly related to the mass of the flange being heated and the surface area of the flange that is exposed to the air. By reducing the mass of the flange, less energy is required and the flange may be heated more quickly than flanges having the same surface area but a larger mass. In addition, the reduction in the weight of the pipe flange 20 also reduces the per piece material and transportation costs associated with the each pipe flange 20.

Figure 4:
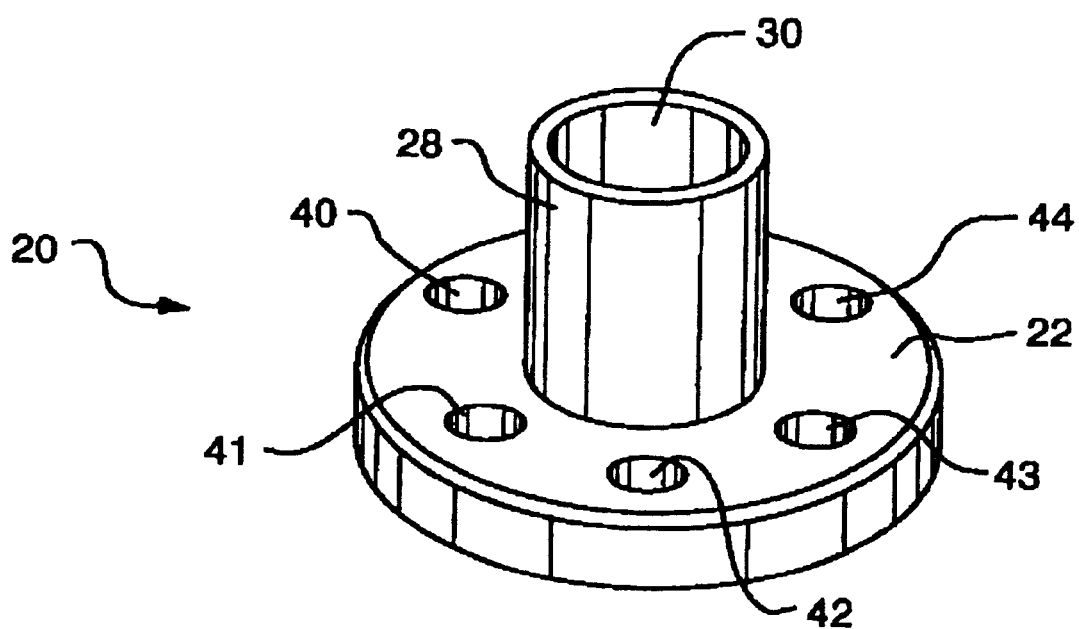
FIG. 4 is an isometric view of one embodiment of a circular sweat flange of the present invention.

Referring now to FIG. 4, still another embodiment of the sweat flange 20 of the present invention is shown. This embodiment includes a shoulder portion 28 and a round base portion 22 that includes six openings 40–45, disposed substantially radially about the shoulder portion 28. Although this embodiment is shown as having a base portion 22 of substantially uniform cross section, it is recognized that the base portion may also include thinned portions in order to reduce the mass of the flange, allowing faster heating and reducing material and transportation costs.

Figure 5:
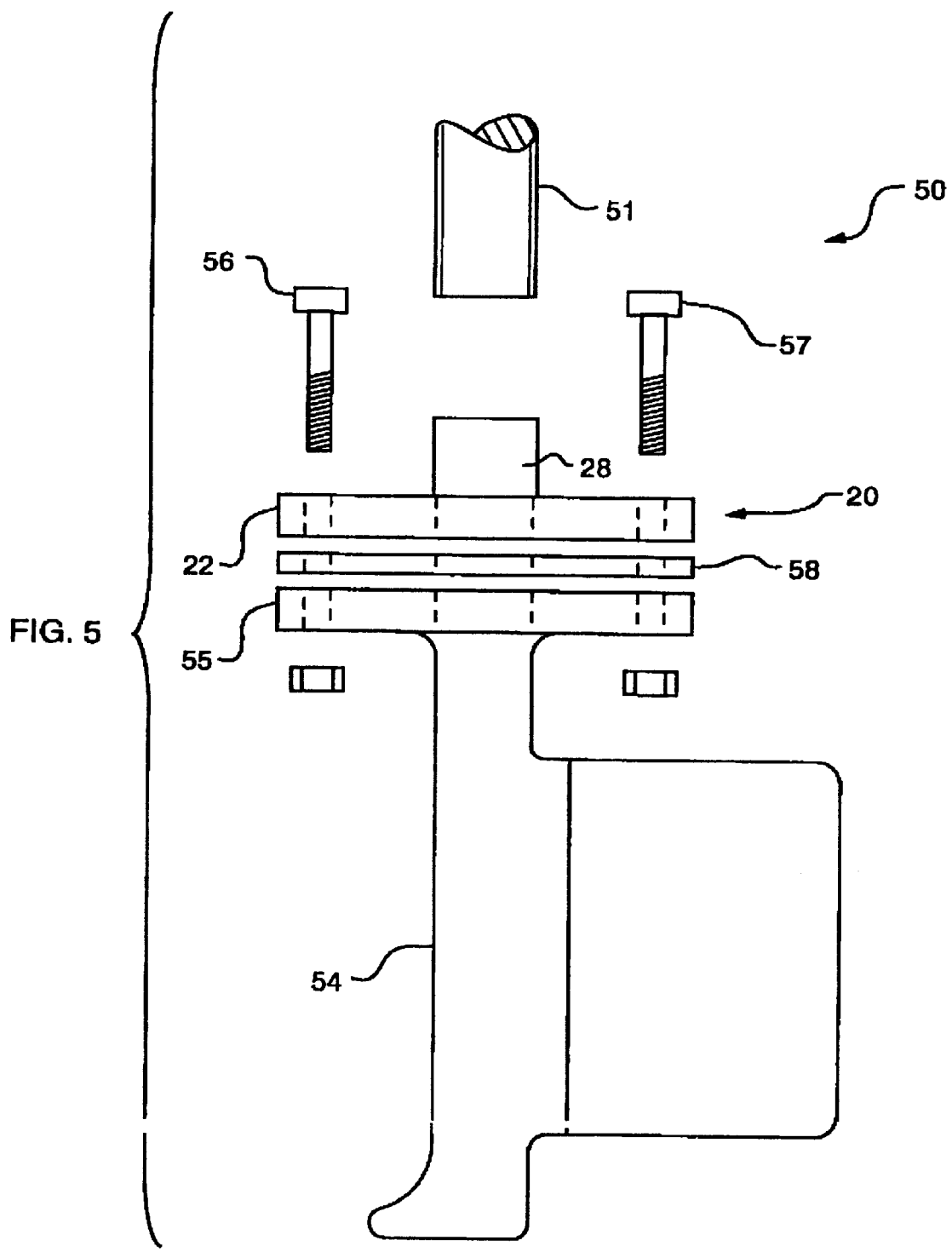
FIG. 5 is an exploded diagrammatic view of the piping system of the present invention that uses a flange with a shoulder and no interior threads. This shoulder acts as a receptacle for a pipe.

Referring next to FIG. 5, an exploded diagrammatic view of the piping system of the present invention that uses a sweat flange 20, such as those described with reference to FIGS. 2A–4. Piping system 50 includes a copper pipe 51, sweat flange 20, a circulator 54, or other pump, having a volute flange 55, mounting bolts 56, 57 and gasket 58. An installer would assemble the system in the arrangement shown in FIG. 5. The copper pipe 51 and interior of the shoulder portion 28 of the sweat flange 20 are cleaned and fluxed. The copper pipe 51 is then inserted into the shoulder portion 28 of the sweat flange 20 and the pipe 51 and flange 20 held together and heated, using a torch or other art recognized heating means, until the pipe 51 and flange 20 are at a temperature above the melting temperature of a solder to be utilized. The solder (not shown) is then applied about the junction of the shoulder portion 28 and pipe 51 using art recognized techniques and the pipe 51 and flange 20 are allowed to cool. Once the pipe 51 and flange 20 are sufficiently cooled, the circulator 54 is disposed such that the volute flange 55 is adjacent to the base portion 22 of pipe flange 20. Gasket 58 is then positioned between pipe flange 20 and volute flange 55 and mounting bolts 56, 57 are passed through the openings in pipe flange 20 and volute flange 55 and secured.

Gasket 58 may be a round gasket or may be shaped in the same configuration as the base portion 22 of the sweat flange 20. In the preferred embodiment, gasket 58 is manufactured from a hard rubber, but in other embodiments, gaskets manufactured from TEFLON®, NEOPRENE®, or cork may be utilized to achieve similar results.

Circulator 54 may be any commonly used circulator or water pump. Circulator 54 includes the pump, or cartridge, portion and a volute portion having at least one volute flange 55. In the preferred embodiment, circulator is an "00" series circulator manufactured by Taco, Inc. of Cranston, R.I. or a "Brute" series circulator manufactured by Grundfos, Inc. of Clovis, Calif.

Figure 6:
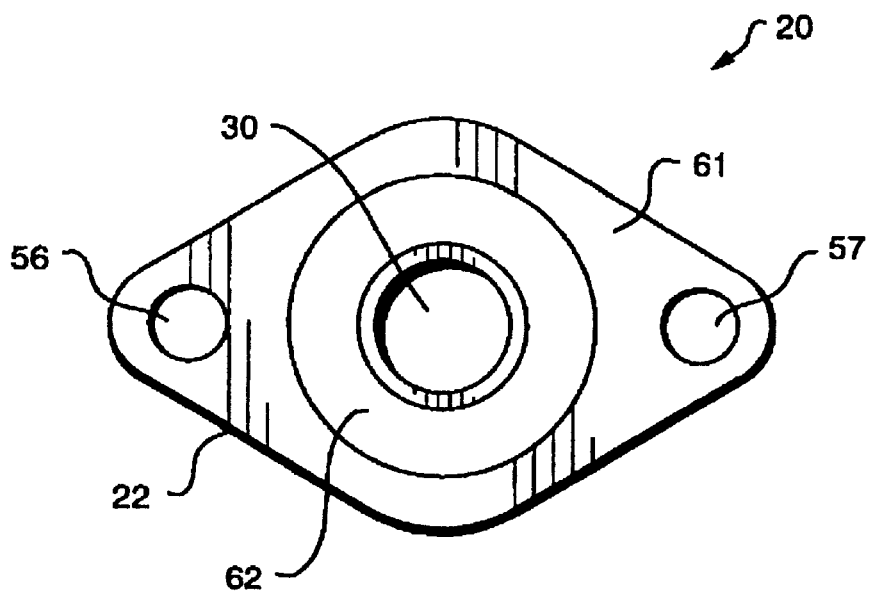
FIG. 6 is a bottom view of one embodiment of the mounting surface of an elliptical volute flange of the present invention.
Figure 7:
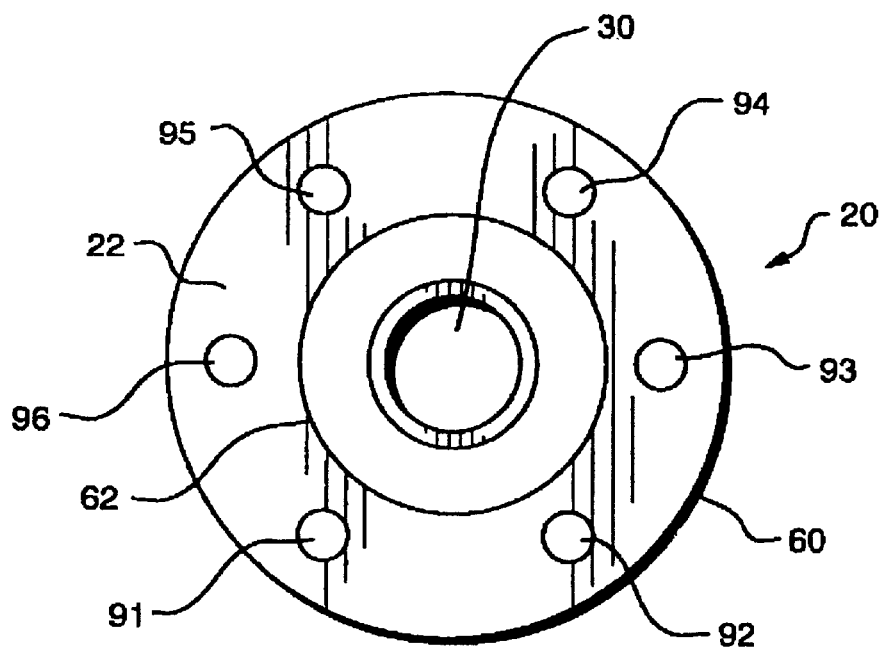
FIG. 7 is a bottom view of one embodiment of the mounting surface of a circular volute flange of the present invention.

Referring now to FIGS. 6 & 7, bottom views of sweat flanges 20 having elliptical and circular base portions 22, are respectively shown. Base portions 22 have substantially flat bottoms 61 that are broken by the bolt openings, 56, 57 and 91–96, and openings 30. In these embodiments, substantially round recessed portions 62 are disposed about the openings 30 to permit round gaskets (not shown) to be retained about the openings 30. Recessed portions 62 are dimensioned to allow the gasket to be retained while still being able to be compressed during installation. It is recognized, however, that the recessed portion 62 is eliminated in other embodiments with both round and elliptically shaped gaskets being used. It is also recognized that the recessed portion 62 may be included in the volute flanges 55 rather than in the sweat flanges 20 of the present invention to achieve similar results.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. A sweat flange comprising:
   a base portion having a predetermined shape and at least two bolt openings dimensioned to accept at least two mounting bolts;
   a shoulder portion extending from said base portion; and
   a substantially circular pipe opening extending through the base portion and the shoulder portion, said opening having a first portion dimensioned to accept a pipe and a second portion of decreased dimension for limiting a travel of the pipe;
   wherein said sweat flange is manufactured of a solderable material, and wherein the pipe may be inserted within said pipe opening in said sweat flange and soldered to said sweat flange.

2. The sweat flange as claimed in claim 1 wherein said base portion has an elliptical shape.

3. The sweat flange as claimed in claim 1 wherein said solderable material is a material selected from a group consisting of brass, copper, and bronze.

4. The sweat flange as claimed in claim 1 wherein said base portion further comprises a thinned area around and between said shoulder portion and said bolt openings in said base portion such that a weight of said sweat flange is decreased.

5. The sweat flange as claimed in claim 1 wherein said base portion further comprises a substantially flat bottom having a recessed portion disposed about said pipe opening for receiving a circular gasket.

6. A piping system comprising:
   a solderable pipe;
   at least two mounting bolts;
   a pump comprising at least one volute flange, said volute flange comprising a volute opening and at least two bolt openings dimensioned to accept said at least two mounting bolts; and
   a sweat flange comprising;
      a base portion dimensioned to mate with said at least one volute flange of said pump and comprising at least two bolt openings dimensioned to accept said at least two mounting bolts;
      a shoulder portion extending from the base portion; and
      a substantially circular pipe opening extending through the base portion and said shoulder portion, said opening having a first portion dimensioned to accept a pipe and a second portion of decreased dimension for limiting a travel of the pipe;
   wherein said sweat flange is manufactured of a solderable material, and wherein said system is assembled by inserting said pipe within said pipe opening in said sweat flange, soldering said pipe to said sweat flange, allowing said pipe and said sweat flange to cool, aligning said bolt openings of said sweat flange with said bolt openings of said volute flange, and disposing and securing said mounting bolts through said bolt openings in said pipe flange and said volute flange such that said pipe flange and said pump are secured together.

7. The piping system as claimed in claim 6 wherein said sweat flange is manufactured of a solderable material selected from a group consisting of brass, copper, and bronze.

8. The piping system as claimed in claim 6 wherein said base portion of said sweat flange further comprises a thinned area around and between said shoulder portion and said bolt openings in said base portion such that a weight of said sweat flange is decreased.

9. The piping system as claimed in claim 6 further comprising a gasket disposed between said sweat flange and said volute flange.

10. The piping system as claimed in claim 9 wherein said gasket is substantially circular in shape and wherein said base portion of said sweat flange further comprises a substantially flat bottom having a recessed portion disposed about said pipe opening for receiving said substantially circular gasket.

11. A method of installing a circulator to a length of copper pipe comprising the steps of:

inserting said copper pipe within a pipe opening in a sweat flange;

soldering said copper pipe to said sweat flange;

allowing said copper pipe and said sweat flange to cool;

aligning a pair bolt openings of said sweat flange with a pair of bolt openings of a volute flange of said circulator; and disposing and securing a pair of mounting bolts through said bolt openings in said sweat flange and said volute flange such that said pipe flange and said circulator are secured together.

12. The method as claimed in claim 10 further comprising the step of disposing a gasket between said sweat flange and said volute flange.

* * * * *